(12) United States Patent
Liu et al.

(10) Patent No.: US 10,616,017 B2
(45) Date of Patent: Apr. 7, 2020

(54) RELIABLE DUAL SUB-CARRIER MODULATION SCHEMES IN HIGH EFFICIENCY WLAN

(71) Applicant: MEDIATEK INC., Hsinchu (TW)

(72) Inventors: Jianhan Liu, San Jose, CA (US); Tianyu Wu, Fremont, CA (US); Thomas Edward Pare, Jr., Mountain View, CA (US); YungPing Hsu, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 418 days.

(21) Appl. No.: 15/164,690

(22) Filed: May 25, 2016

(65) Prior Publication Data

US 2016/0352552 A1    Dec. 1, 2016

Related U.S. Application Data

(60) Provisional application No. 62/166,253, filed on May 26, 2015, provisional application No. 62/192,146, filed on Jul. 14, 2015.

(51) Int. Cl.
*H04L 27/32* (2006.01)
*H04W 28/10* (2009.01)
(Continued)

(52) U.S. Cl.
CPC ....... *H04L 27/2602* (2013.01); *H04B 1/7176* (2013.01); *H04L 5/0023* (2013.01);
(Continued)

(58) Field of Classification Search
CPC ............ H04L 27/0008; H04L 27/2637; H04B 1/7176
(Continued)

(56) References Cited

U.S. PATENT DOCUMENTS

2002/0196779 A1* 12/2002 Khadri ................. H04Q 3/0025
370/352
2005/0195765 A1* 9/2005 Sharon ................. H04B 1/7176
370/330
(Continued)

FOREIGN PATENT DOCUMENTS

WO    WO2016029874 A1    8/2014

OTHER PUBLICATIONS

EPO, Search Report for the EP patent application 16171692.3 dated Oct. 14, 2016 (9 pages).
(Continued)

*Primary Examiner* — Asad M Nawaz
*Assistant Examiner* — Jason A Harley
(74) *Attorney, Agent, or Firm* — Imperium Patent Works; Zheng Jin (57) ABSTRACT

Modulation schemes that use dual sub-carrier to reliably transmit physical layer related signaling information and/or data in high efficiency wireless local area network (HE WLAN) are proposed. The proposed schemes can be implemented with low complexity and provide better performance than existing modulation schemes used in WLAN that are based on IEEE 802.11/a/b/g/n/ac standards. The proposed schemes enhance the reliability of transmissions, especially under narrow band interferences. In accordance with a novel aspect, dual subcarrier modulation (DCM) is introduced in HE WLAN. DCM can introduce frequency diversity into OFDM systems by transmitting the same information on two subcarriers separated in frequency. A DCM indication scheme is used such that both encoding and decoding of DCM is really simple.

17 Claims, 5 Drawing Sheets (51) Int. Cl.
   *H04W 28/02* (2009.01)
   *H04L 27/26* (2006.01)
   *H04L 27/00* (2006.01)
   *H04W 74/00* (2009.01)
   *H04L 5/00* (2006.01)
   *H04B 1/7176* (2011.01)
   *H04W 84/12* (2009.01)

(52) U.S. Cl.
   CPC .......... *H04L 5/0053* (2013.01); *H04L 5/0092* (2013.01); *H04L 27/2613* (2013.01); *H04W 84/12* (2013.01)

(58) Field of Classification Search
   USPC ........................................................ 375/302
   See application file for complete search history.

(56) References Cited

U.S. PATENT DOCUMENTS

| | | | | | |
|---|---|---|---|---|---|
| 2007/0189156 | A1* | 8/2007 | Wang | ................... | H04L 1/0054 370/219 |
| 2008/0137718 | A1* | 6/2008 | Cha | ..................... | H04L 1/0041 375/146 |
| 2008/0239936 | A1* | 10/2008 | Doberstein | .......... | H04L 1/0055 370/201 |
| 2008/0310526 | A1* | 12/2008 | Maltsev | ............. | H04L 27/2628 375/260 |
| 2009/0004984 | A1* | 1/2009 | Chrabieh | .............. | H04L 5/0044 455/205 |
| 2009/0086731 | A1* | 4/2009 | Lee | ........................ | H04H 60/73 370/389 |
| 2014/0307612 | A1* | 10/2014 | Vermani | ............. | H04L 27/2613 370/312 |
| 2015/0023449 | A1* | 1/2015 | Porat | .................... | H04L 5/0048 375/295 |
| 2016/0065467 | A1 | 3/2016 | Wu et al. | ....................... | 370/392 |
| 2016/0156438 | A1* | 6/2016 | Sun | .................... | H04L 27/2602 370/330 |
| 2016/0204912 | A1* | 7/2016 | Sun | .................... | H04L 27/2613 375/302 |
| 2016/0323426 | A1* | 11/2016 | Hedayat | ........... | H04W 28/0268 |
| 2016/0323428 | A1* | 11/2016 | Kim | ....................... | G06F 1/1658 |
| 2016/0353414 | A1* | 12/2016 | Choi | ....................... | H04W 4/70 |

OTHER PUBLICATIONS

IEEE P802.15 Wireless Personal Area Networks, Project IEEE P802.15 Working Group for Wireless Personal Area Networks (WPANs), Tim Schmidl, Jan. 2010 IEEE P802.15-10-0013-00-004g (21 pages).

Analysis and Evaluation of MB-OFDM Dual Carrier Modulation, Darryn Lowe et al., Proceedings of the Australian Telecommunication Networks and Applications Conference (Dec. 5, 2006).

* cited by examiner

| | | 700 |
|---|---|---|
| COMMON CONTENT | USER-SPECIFIC (USER 1) | USER-SPECIFIC (USER 2) | ---- | USER-SPECIFIC (USER N) |

710

| BIT | SUBFIELD | NUMBER OF BITS | DESCRIPTION |
|---|---|---|---|
| TBD | STAID | 11 | STATION IDENGTIFIER |
| TBD | NSTS | 3 | NUMBER OF SPATIAL STREAMS |
| TBD | TX BEAMFORMING | 1 | USER OF TRANSMIT BEAMFORMING |
| TBD | MCS | 4 | MODUALTION AND CODING SCHEME |
| TBD | DCM | 1 | INDICATION FOR USE OF DUAL CARRIER MODULATION |
| TBD | CODING | 1 | INDICATION FOR USE OF LDCP |

RELIABLE DUAL SUB-CARRIER MODULATION SCHEMES IN HIGH EFFICIENCY WLAN

CROSS REFERENCE TO RELATED APPLICATIONS

This application claims priority under 35 U.S.C. § 119 from U.S. Provisional Application No. 62/166,253, entitled "Reliable Dual Sub-Carrier Modulation Schemes in High Efficiency WLAN," filed on May 26, 2015; U.S. Provisional Application No. 62/192,146, entitled "Reliable Dual Sub-Carrier Modulation Schemes in High Efficiency WLAN," filed on Jul. 14, 2015, the subject matter of which is incorporated herein by reference.

TECHNICAL FIELD

The disclosed embodiments relate generally to wireless network communications, and, more particularly, to dual subcarrier modulation (DCM) and indication in wireless communications systems.

BACKGROUND

IEEE 802.11 is a set of media access control (MAC) and physical layer (PHY) specification for implementing wireless local area network (WLAN) communication in the Wi-Fi (2.4, 3.6, 5, and 60 GHz) frequency bands. The 802.11 family consists of a series of half-duplex over-the-air modulation techniques that use the same basic protocol. The standards and amendments provide the basis for wireless network products using the Wi-Fi frequency bands. For example, IEEE 802.11ac is a wireless networking standard in the IEEE 802.11 family providing high-throughput WLANs on the 5 GHz band. Significant wider channel bandwidths (20 MHz, 40 MHz, 80 MHz, and 160 MHz) were proposed in the IEEE 802.11ac standard. The High Efficiency WLAN study group (HEW SG) is a study group within IEEE 802.11 working group that will consider the improvement of spectrum efficiency to enhance the system throughput in high-density scenarios of wireless devices. Because of HEW SG, TGax (an IEEE task group) was formed and tasked to work on IEEE 802.11ax standard that will become a successor to IEEE 802.11ac. Recently, WLAN has seen exponential growth across organizations in many industries.

Orthogonal Frequency Division Multiple Access (OFDMA) is introduced in HE WLAN to enhance the user experiences by assigning subsets of subcarriers to different users, allowing simultaneous data transmission by several users. In OFDMA, each user is assigned with a group of subcarriers called a resource unit (RU). In HE WLAN, a wireless station (STA) can transmit one minimum size RU (which is about 2 MHz bandwidth) in uplink OFDMA. Compared to its 20 MHz preamble, the power density of its data portion is 9 dB higher than its preamble. This narrow band uplink OFDMA signal is hard to be detected by CCA. Therefore, one STA can experience 9 dB higher interferences on subcarriers in a particular narrow band than other subcarriers. It can be seen that narrow band interferences are intrinsic in HE WLAN. A scheme to deal with such narrow band interferences is needed.

In Multi-User (MU) transmissions, performance of HE-SIG-B is encoded using 1× symbol duration. As a result, its performance is worse than data symbol with 4× symbol duration when used the same modulation and coding scheme (MCS). A more robust modulation scheme is needed for HE-SIGB. In addition, to extend the range for outdoor scenarios, a new modulation scheme that can operate at lower SNR than MCS0 is also desired.

SUMMARY

Modulation schemes that use dual sub-carrier to reliably transmit physical layer related signaling information and/or data in high efficiency wireless local area network (HE WLAN) are proposed. The proposed schemes can be implemented with low complexity and provide better performance than existing modulation schemes used in WLAN that are based on IEEE 802.11/a/b/g/n/ac standards. The proposed schemes enhance the reliability of transmissions, especially under narrow band interferences. In accordance with a novel aspect, dual subcarrier modulation (DCM) is introduced in HE WLAN. DCM can introduce frequency diversity into OFDM systems by transmitting the same information on two subcarriers separated in frequency. A DCM indication scheme is used such that both encoding and decoding of DCM is really simple.

In one embodiment, a source wireless station encodes a data packet to be transmitted to a destination wireless station in a wireless local area network. The data packet comprises one or more signaling fields and a data field. The source wireless station indicates whether dual subcarrier modulation (DCM) is applied in one of the fields. The source wireless station modulates encoded bits of a field over a first subcarrier using a first mapping scheme, and modulates the same encoded bits over a second subcarrier using a second mapping scheme if DCM is applied for the field. The source station transmits the data packet to the destination station.

In another embodiment, a destination wireless station receives a data packet transmitted from a source wireless station in a wireless local area network (WLAN). The data packet comprises one or more signaling fields and a data field. The destination wireless station determines whether dual subcarrier modulation (DCM) is applied in one of the fields. The destination wireless station de-maps received information bits of a field over a first subcarrier using a first de-mapping scheme, and de-maps received information bits of the field over a second subcarrier using a second de-mapping scheme if DCM is applied for the field. The destination station decodes the data packet after performing the de-mapping and demodulation.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
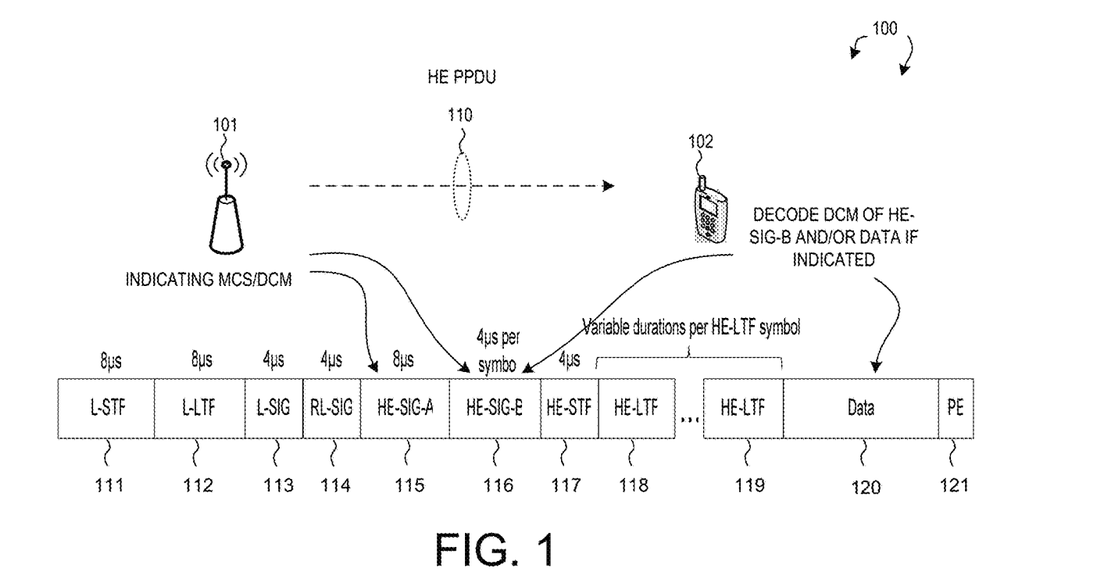
FIG. 1 illustrates a wireless communications system and a high efficiency HE PPDU frame structure supporting MCS and DCM indication in accordance with a novel aspect.

FIG. 1 illustrates a wireless communications system 100 and a high efficiency HE PPDU frame structure supporting modulation and coding scheme (MCS) and dual carrier modulation (DCM) indication in accordance with a novel aspect. Wireless communications network 100 comprises a wireless access point AP 101 and a wireless station STA 102. In wireless communications systems, wireless devices communicate with each other through various well-defined frame structures. In general, a frame comprises a Physical Layer Convergence Procedure (PLCP) Protocol Data Unit (PPDU), a frame header, and a payload. Frames are in turn divided into very specific and standardized sections.

In the example of FIG. 1, a high efficiency (HE) PPDU frame 110 is transmitted from AP 101 to STA 102. HE PPDU 110 comprises a legacy short training field (L-STF 111), a legacy long training field (L-LTF 112), a legacy signal field (L-SIG 113), a repeat legacy signal field (RL-SIG 114), a HE signal A field (HE-SIG-A 115), a HE signal B field (HE-SIG-B 116), a HE short training field (HE-STF 117), a HE long training field for data (HE-LTF 118), HE-data payload 120, and a Packet Extension (PE) 121.

Orthogonal Frequency Division Multiple Access (OFDMA) is introduced in HE WLAN to enhance the user experiences by assigning subsets of subcarriers to different users, allowing simultaneous data transmission by several users. In OFDMA, each user is assigned with a group of subcarriers called a resource unit (RU). In HE WLAN, an STA can transmit one minimum size RU (which is about 2 MHz bandwidth) in uplink OFDMA. Compared to its 20 MHz preamble, the power density of its data portion is 9 dB higher than its preamble. This narrow band uplink OFDMA signal is hard to be detected by CCA. Therefore, one STA can experience 9 dB higher interferences on subcarriers in a particular narrow band than other subcarriers. It can be seen that narrow band interferences are intrinsic in HE WLAN. A scheme to deal with the narrow band interferences is thus needed. In addition, under dense deployment, robustness with narrow-band interference is important to HW WLAN. Enhance the PER performance of HE-data portion can extend the range for outdoor scenarios. A new modulation scheme for HE-data that can operate at lower SNR than MCS0 is also desired.

HE-SIG-B is mainly for intended users. In Multi-User (MU) transmissions, performance of HE-SIG-B is encoded using 1× symbol duration. As a result, its performance is worse than data symbol with 4× symbol duration when used the same modulation and coding scheme (MCS). It is shown that extending CP from 0.8 us to 1.6 us or even 3.2 us is not effective in ensuring that SIG-B is reliable relative to data. A more robust modulation scheme is thus needed for HE-SIGB. HE-SIG-B may contain many bits for OFDMA/MU-MIMO transmissions. Given HE-SIG-B contains the information mainly for intended users, it is OK that not all other STAs receiving HE-SIG-B. The higher the MCS, the higher the efficiency. Therefore, variable MCS should be allowed for HE-SIG-B to enhance the efficiency.

In accordance with a novel aspect, dual sub-carrier modulation (DCM) is introduced in HE WLAN. DCM is a perfect solution to deal with narrow band interferences. DCM can introduce frequency diversity into OFDM systems by transmitting the same information on two subcarriers separated in frequency. For single user transmission, the DCM scheme modulates the same information on a pair of subcarrier n and m, i.e., $0<n<N/2$ and $m=N/2+n$, where N is total number of subcarriers in one OFDM symbol. We call subcarrier n the upper subcarrier and subcarrier m the lower subcarrier. For OFDMA transmissions, one frequency resource block is assigned to a given user. The DCM schemes for the one frequency block is the same as OFDM case for single user.

A DCM indication scheme is proposed such that both encoding and decoding of DCM is really simple. As depicted in FIG. 1, in a first example, HE SIG-A 115 comprises an MCS sub-field indicating the MCS and a DCM bit indicating whether DCM is applied for the subsequent HE SIG-B 116. In a second example, HE SIG-B 116 comprises an MCS sub-field indicating the MCS of a user and a DCM bit indicating whether DCM is applied for the subsequent data payload 120 for that user. If DCM is applied and indicated, then the transmitter modulates the same encoded bits on two separated subcarriers with different mapping schemes. The receiver calculates the logarithm likelihood ratio (LLR) of a received bit either by combining the received signals from the upper subcarrier and the lower subcarrier if the signal to noise ratio (SNR) is considered "good" for the upper and lower subcarriers, or by selecting the received signals from the upper subcarrier or from the lower subcarrier if the SNR is considered "bad" for the lower or upper subcarriers, respectively.

Figure 2:
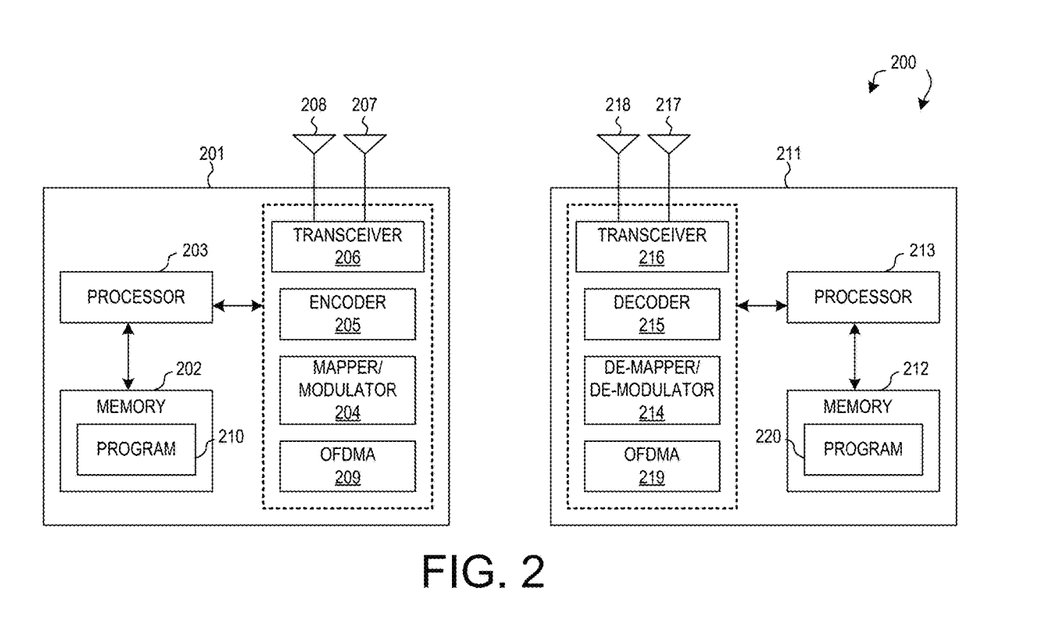
FIG. 2 is a simplified block diagram of a wireless transmitting device and a receiving device in accordance with a novel aspect.

FIG. 2 is a simplified block diagram of wireless devices 201 and 211 in accordance with a novel aspect. For wireless device 201 (e.g., a transmitting device), antennae 207 and 208 transmit and receive radio signal. RF transceiver module 206, coupled with the antennae, receives RF signals from the antennae, converts them to baseband signals and sends them to processor 203. RF transceiver 206 also converts received baseband signals from the processor, converts them to RF signals, and sends out to antennae 207 and 208. Processor 203 processes the received baseband signals and invokes different functional modules and circuits to perform features in wireless device 201. Memory 202 stores program instructions and data 210 to control the operations of device 201.

Similarly, for wireless device 211 (e.g., a receiving device), antennae 217 and 218 transmit and receive RF signals. RF transceiver module 216, coupled with the antennae, receives RF signals from the antennae, converts them to baseband signals and sends them to processor 213. The RF transceiver 216 also converts received baseband signals from the processor, converts them to RF signals, and sends out to antennae 217 and 218. Processor 213 processes the received baseband signals and invokes different functional modules and circuits to perform features in wireless device 211. Memory 212 stores program instructions and data 220 to control the operations of the wireless device 211.

The wireless devices 201 and 211 also include several functional modules and circuits that can be implemented and configured to perform embodiments of the present invention. In the example of FIG. 2, wireless device 201 is a transmitting device that includes an encoder 205, a symbol mapper/modulator 204, and an OFDMA module 209. Wireless device 211 is a receiving device that includes a decoder 215, a symbol de-mapper/de-modulator 214, and a OFDMA module 219. Note that a wireless device may be both a transmitting device and a receiving device. The different functional modules and circuits can be implemented and configured by software, firmware, hardware, and any combination thereof. The function modules and circuits, when executed by the processors 203 and 213 (e.g., via executing program codes 210 and 220), allow transmitting device 201 and receiving device 211 to perform embodiments of the present invention.

In one example, at the transmitter side, device 201 generates a HE PPDU frame, and inserts both MCS and DCM indication bit in a signal field of the HE PPDU frame. Device 201 then applies corresponding MCS and DCM and transmits the HE PPDU to the receiver. At the receiver side, device 211 receives the HE PPDU, and decodes the MCS and DCM indication bit. If the DCM indication bit is zero, then the receiver calculates the logarithm likelihood ratio (LLR) of a received bit for each subcarrier based on the indicated MCS. On the other hand, if the DCM indication bit is equal to one, then the receiver calculates the LLR by performing LLR combining of the upper subcarrier and the lower subcarrier. Various embodiments of such transmitting device and receiving device are now described below with accompany drawings.

Figure 3:
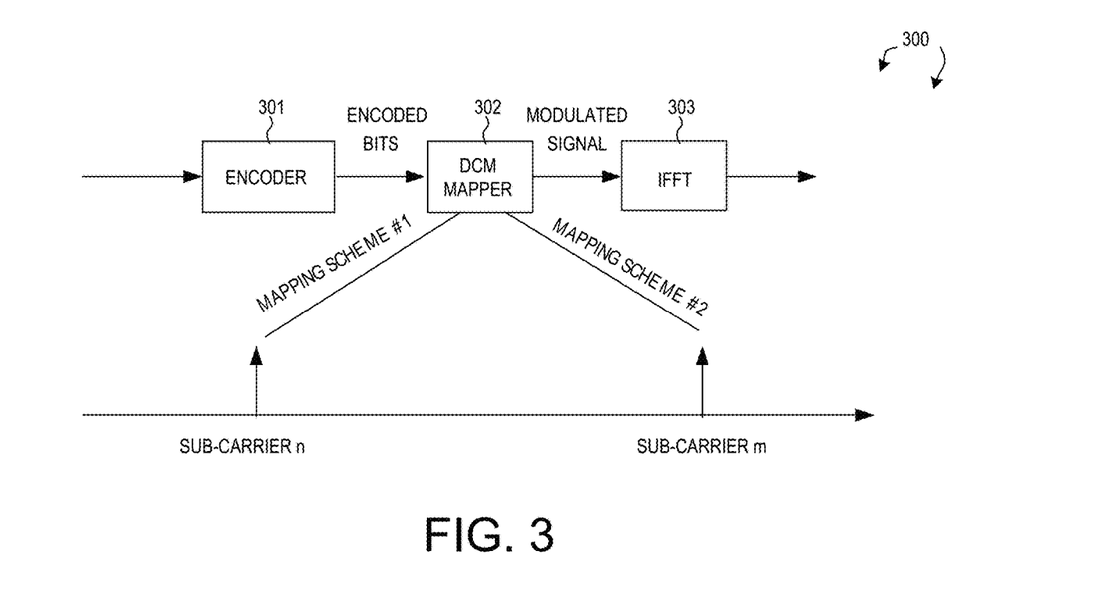
FIG. 3 is a simplified diagram of a transmitting device that applies DCM modulation.

FIG. 3 is a simplified diagram of a transmitting device 300 that applies DCM modulation. The encoded bits (may go through a bit interleaver for BCC, not shown) output from encoder 301 is fed into the DCM block 302. DCM 302 modulates the same encoded bits on two separate subcarriers with possibly different mapping schemes. For example, as shown in FIG. 3, subcarrier n and subcarrier m carry the same bit information. Subcarrier n is the lower subcarrier and is applied with mapping scheme #1, subcarrier m is the upper subcarrier and is applied with mapping scheme #2. The modulated signal is then fed into IFFT 303 and to be transmitted.

Assume the modulated signal for subcarrier n and subcarrier m are denoted as $s_n$ and $s_m$ respectively. For BPSK DCM, $s_n$ and $s_m$ can be obtained by mapping 1-bit encoded bit $b_0$ on two identical or different BPSK constellation (e.g., BPSK and SBPSK). For example, one BPSK DCM mapping scheme can be $$s_n = 1 - 2b_0$$

$$s_m = (1 - 2b_0)e^{jm\pi}$$

For QPSK DCM, $s_n$ and $s_m$ can be obtained by mapping 2-bit encoded stream $b_0$ $b_1$ on two identical or different QPSK constellation. For example, $s_n$ can be mapped using QPSK and $s_m$ can be mapped using staggered quadrature phase-shift keying (SQPSK) or other rotated QPSK schemes, respectively.

Figure 4:
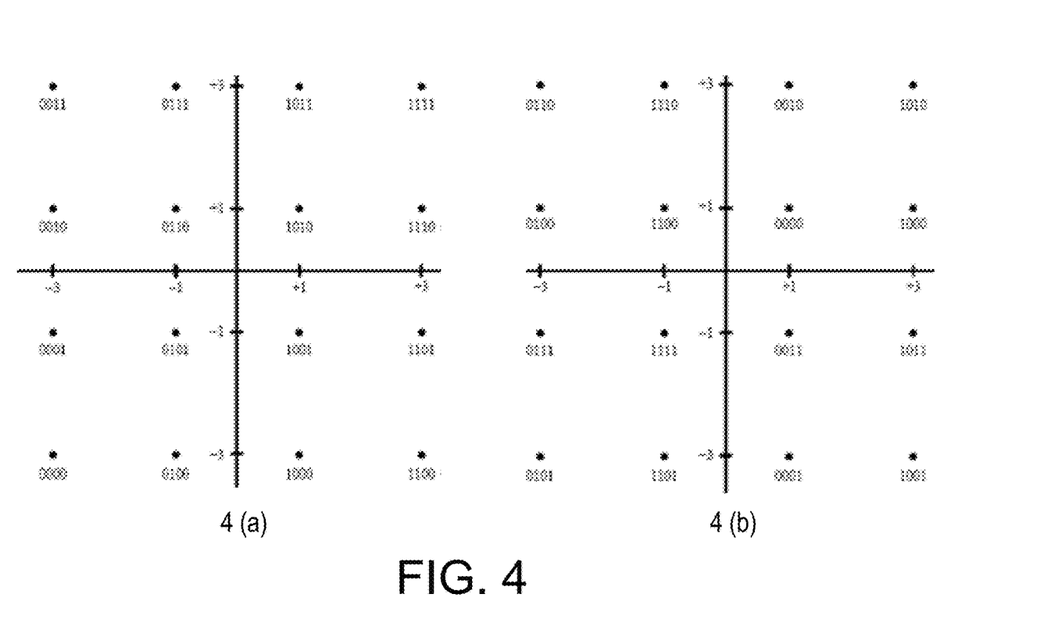
FIG. 4 illustrates one example of modulation mapping scheme for 16QAM DCM.

FIG. 4 illustrates one example of modulation mapping scheme for 16QAM DCM. For 16QAM DCM, $s_n$ and $s_m$ are obtained by mapping a 4-bit stream $b_0 b_1 b_2 b_3$ on two different 16QAM constellation respectively. As shown in FIG. 4, $s_n$ is modulated using constellation scheme shown in 4(a) and $s_m$ is modulated using constellation scheme shown in 4(b):

$$s_n = [1 \quad 2 \quad j \quad 2j] \begin{bmatrix} B_0 \\ B_1 \\ B_2 \\ B_3 \end{bmatrix}$$

-continued $$s_m = [2 \quad -1 \quad 2j \quad -j] \begin{bmatrix} B_0 \\ B_1 \\ B_2 \\ B_3 \end{bmatrix}$$

Where $$B_i = \begin{cases} -1 & b_i = 0 \\ +1, & b_i = 1 \end{cases}$$

For higher modulation schemes such as 64QAM and 256QAM, DCM can also be applied using two different mapping schemes for Sn and Sm on the same encoded bit stream. Modulations higher than 16QAM is not recommended for DCM. This is because DCM may reduce data rate for higher modulation to achieve higher performance.

For HE WLAN, one-bit indication for DCM should be inserted in the signal field. If the DCM indication bit is set to 1, then the DCM scheme is applied for the MCS used by a given packet. The DCM schemes can be also applied to PHY signal field. A HE-PPDU packet can contain multiple SIG fields as shown. In HE-PPDU, the number of HE-SIG-B symbols is variable and it is indicated in HE-SIG-A. The modulation scheme of HE-SIG-B is indicated in HE-SIG-A. HE-SIG-B can be modulated in each 20 MHz or over the whole bandwidth.

Figure 5:
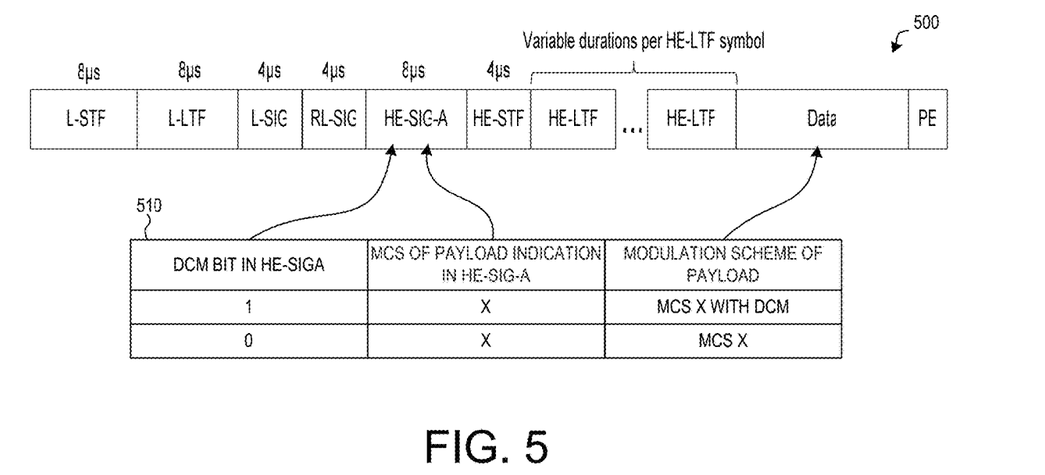
FIG. 5 illustrates a HE SU PPDU or HE extended range SU PPDU with DCM indication field in HE-SIG-A.

FIG. 5 illustrates a HE SU PPDU 500 or HE extended range SU PPDU 500 with DCM indication field in HE-SIG-A. For single user PPDU, there is only HE-SIG-A field, no HE-SIG-B field. In the HE-SIG-A, there is a DCM subfield to indicate if the data portion is DCM modulated or not. DCM modulation is combined with MCS index to indicate the modulation scheme. The DCM is only valid for MCS0, MCS1, MCS3, and MCS4. For other MCS, DCM field is reserved. As shown in Table 510, in HE-SIG-A field, there is one-bit indication for DCM in addition to the MCS indication for data payload. If the MCS is indicated to be X, and DCM bit is "0", then the modulation scheme of data payload is MCS X without DCM. On the other hand, if the MCS is indicated to be X, and DCM bit is "1", then the modulation scheme of data payload is MCS X with DCM. At the receiver side, the receiver first decodes both the DCM bit and the MCS, and then performs the demodulation and decoding for the data payload accordingly. The data rate for MCS0+DCM is half of MCS0, the data rate for MCS1+DCM is the same as MCS0, the data rate for MCS3+DCM is the same as MCS1, the data rate for MCS4+DCM is the same as MCS2.

Figure 6:
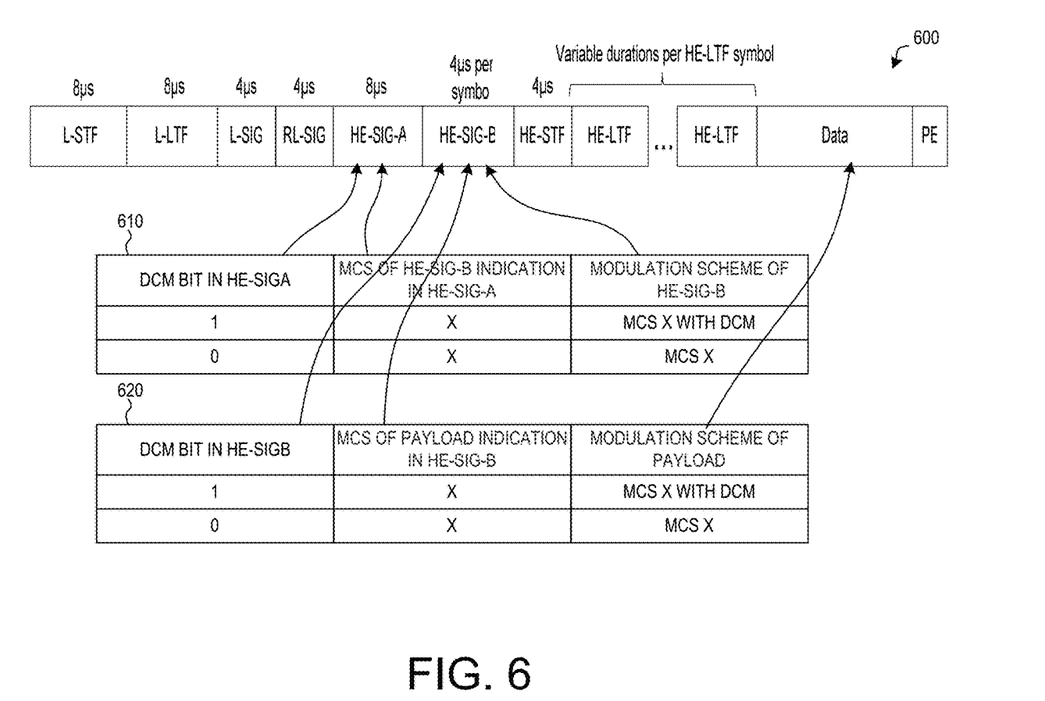
FIG. 6 illustrates a HE MU PPDU with DCM indication in HE-SIG-A and/or in HE-SIG-B.

FIG. 6 illustrates a HE MU PPDU 600 with DCM indication in HE-SIG-A and/or in HE-SIG-B. For multi-user HE PPDU, there is HE-SIG-A field as well as HE-SIG-B field. In the HE-SIG-A field, there is a DCM field to indicate if the HE-SIG-B portion is DCM modulated or not. As shown in Table 610, in HE-SIG-A field, there is one-bit indication for DCM in addition to the MCS indication for HE-SIG-B. If the MCS is indicated to be X, and DCM bit is "0", then the modulation scheme of HE-SIG-B is MCS X without DCM. On the other hand, if the MCS is indicated to be X, and DCM bit is "1", then the modulation scheme of HE-SIG-B is MCS X with DCM. At the receiver side, the receiver first decodes both the DCM bit and the MCS in HE-SIG-A, and then performs the demodulation and decoding for HE-SIG-B accordingly.

In the HE-SIG-B field, for each user, there is a DCM field to indicate if the data portion (payload) for this user is DCM modulated or not. For example, the HE MU PPDU transmits to six users. There can be four users are DCM modulated (the DCM field for these four users are set to one), and two users are not (the DCM field for these two users are set to zero). As shown in Table 620, in HE-SIG-B field, for each given user, there is one-bit indication for DCM in addition to the MCS indication for data payload. If the MCS is indicated to be X, and DCM bit is "0", then the modulation scheme of data payload is MCS X without DCM. On the other hand, if the MCS is indicated to be X, and DCM bit is "1", then the modulation scheme of data payload is MCS X with DCM. At the receiver side, the receiver first decodes both the DCM bit and the MCS in HE-SIG-B, and then performs the demodulation and decoding for the data payload accordingly.

Figure 7:
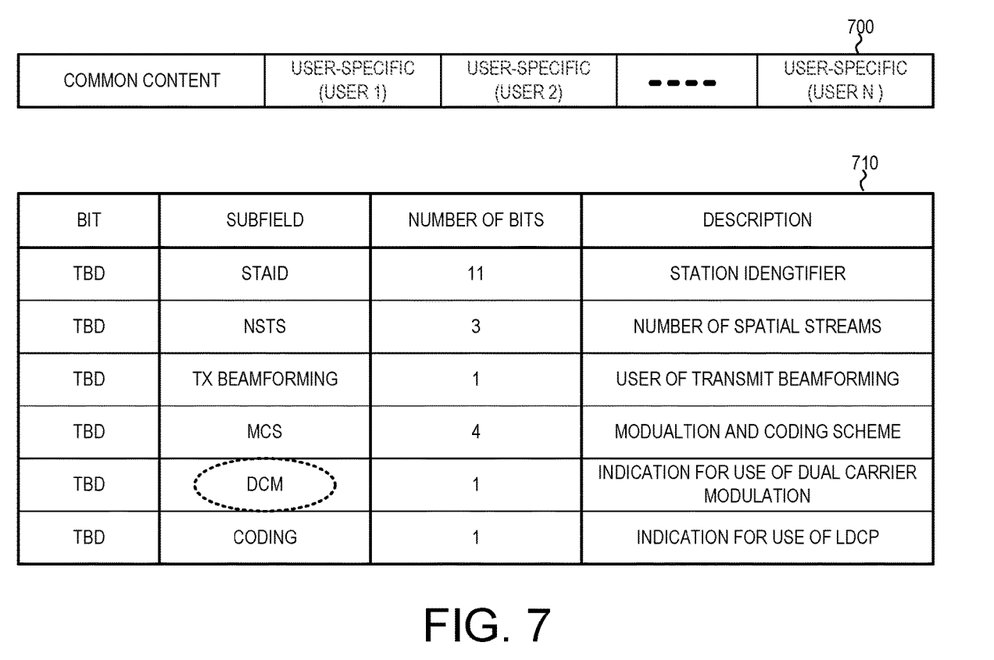
FIG. 7 illustrates an example of DCM field in HE-SIG-B of a HE MU PPDU.

FIG. 7 illustrates an example of DCM field in HE-SIG-B 700 of a HE MU PPDU. HE-SIG-B field 700 contains a common content field and multiple user-specific fields. In each user-specific field, when one RU is assigned to a single user, then DCM field is applied. Table 710 shows the different subfields of a user-specific field in HE-SIG-B, which includes a DCM subfield indicating for user of DCM of the corresponding user.

The two frequency subcarriers used for DCM can be pre-determined. For example, for single user transmission, DCM modulation can be applied to subcarrier k and k+N/2, where N is the total number of subcarriers in one OFDM symbol. For OFDMA transmission, DCM modulation can be applied to two equal frequency resource blocks assigned to a given user. The transmission method of using DCM can be implemented even with interferences presented in one frequency band or frequency resource block. For example, for non-WiFi signals or OBSS signals, different clear channel assessment (CCA) threshold can be applied for two frequency bands.

Figure 8:
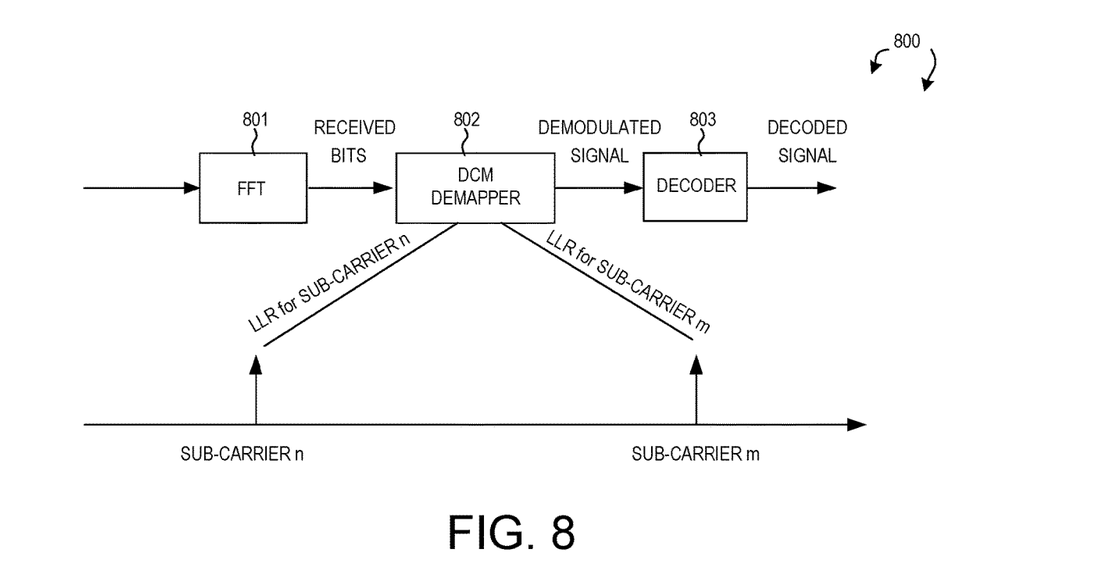
FIG. 8 is a simplified diagram of a receiving device that applies DCM modulation.

FIG. 8 is a simplified diagram of a receiving device 800 that applies DCM de-modulation. At the receiver, the received signal through FFT 801 can be written as:

$$r_n = h_n s_n + v_n \quad \text{Upper subcarrier}$$

$$r_m = h_m s_m + v_m \quad \text{Lower subcarrier}$$

Where $h_n$ and $h_m$ are channel response matrixes for subcarriers n and m $v_n$ and $v_m$ are modeled as AWGN noise The de-mapper/demodulator 802 of the receiver can calculate the logarithm likelihood ratio (LLR) of a received bit by combining the received signals from the upper subcarrier and the lower subcarrier if the SNR is considered "good" for the upper and lower subcarriers. Alternatively, the receiver can choose to calculate the LLR of a received bit just from the upper subcarrier or from the lower subcarrier if the SNR is considered "bad" for the lower or the upper subcarriers, respectively. The demodulated signal is then fed to decoder 803 for outputting the decoded signal.

For BPSK DCM and QPSK DCM de-mapping, one of the LLR combinations can be as follows:

$$\Lambda(b_0) = \frac{\Lambda_n(b_0) + \Lambda_m(b_0)}{2}$$

Where $\nabla_n(b_0)$ and $\nabla_m(b_0)$ are the LLR calculated from subcarrier n and sub-carrier m respectively.

For 16QAM DCM de-mapping, one of the LLR combinations can be as follows:

$$\Lambda(b_0) = \log \frac{P(b_0 = 1 \mid (r_n, r_m))}{P(b_0 = 0 \mid (r_n, r_m))}$$

$$= \log \frac{P((r_n, r_m) \mid b_0 = 1)}{P((r_n, r_m) \mid b_0 = 0)} + \underbrace{\log \frac{P(b_0 = 1)}{P(b_0 = 0)}}_{= 0}$$

$$= \log \frac{\sum_{b_1 b_2 b_3} P((r_n, r_m) \mid 1 b_1 b_2 b_3)}{\sum_{b_1 b_2 b_3} P((r_n, r_m) \mid 0 b_1 b_2 b_3)}$$

$$= \log \frac{\sum_{b_1 b_2 b_3} [P(r_n \mid 1 b_1 b_2 b_3) P(r_m \mid 1 b_1 b_2 b_3)]}{\sum_{b_1 b_2 b_3} [P(r_n \mid 0 b_1 b_2 b_3) P(r_m \mid 0 b_1 b_2 b_3)]}$$

Obviously, $0 b_1 b_2 b_3$ corresponds to 8 pairs of "bound symbols", denoted as $\{S_n, S_m\}: b_0 = 0$. Similarly, $1 b_1 b_2 b_3$ corresponds to 8 pairs of "matched symbols", denoted as $\{S_n, S_m\}: b_0 = 1$. Since $v_n$ and $v_m$ are modeled as AWGN noise with zero mean and variance $\sigma_n^2$ and $\sigma_m^2$ respectively, we have the following probability measurements:

$$P((r_n, r_m) \mid b_0 = 0) = \sum_{\{S_n, S_m\}: b_0 = 0} \exp\left(-\frac{\|r_n - h_n s_n\|^2}{\sigma_n^2} - \frac{\|r_m - h_m s_m\|^2}{\sigma_m^2}\right)$$

$$P((r_n, r_m) \mid b_0 = 1) = \sum_{\{S_n, S_m\}: b_0 = 1} \exp\left(-\frac{\|r_n - h_n s_n\|^2}{\sigma_n^2} - \frac{\|r_m - h_m s_m\|^2}{\sigma_m^2}\right)$$

Please note that the coefficient $$\frac{1}{\pi^2 \sigma_n^2 \sigma_m^2}$$

in the PDF of each pair of complex Gaussian random variables is ignored because it will be cancelled during the calculation of the ration. Combining the above equations, the LLR of $b_0$ can be written as:

$$\Lambda(b_0) = \log \frac{\sum_{\{S_n, S_m\}: b_0 = 1} \exp\left(-\frac{\|r_n - h_n s_n\|^2}{\sigma_n^2} - \frac{\|r_m - h_m s_m\|^2}{\sigma_m^2}\right)}{\sum_{\{S_n, S_m\}: b_0 = 0} \exp\left(-\frac{\|r_n - h_n s_n\|^2}{\sigma_n^2} - \frac{\|r_m - h_m s_m\|^2}{\sigma_m^2}\right)}$$

There are many advantages of using DCM. No latency is added for modulation within one OFDM symbol. No extra complexity is introduced at modulator and demodulator. For modulation, no extra complexity, just modulate the subcarriers in the upper band and the subcarriers in lower band the similar way. For demodulation, LLR calculation is really simple. For QPSK, just add two LLRs. For 16QAM, just need a few simple additional subtractions. Simulation results show that PER performance improve more than 2 dB gain for MCS0 and MCS2 in 4× symbol. Such performance gain is significant. For wider bandwidth (>20 MHz), larger performance gain can be expected due to larger frequency diversity gain. Error floor is also reduced for outdoor channels. Overall, the DCM scheme results in more robustness to sub-band interferences and provides a very good data rate vs. PER tradeoff between QPSK ½ rate code and 16QAM ½ rate code.

Figure 9:
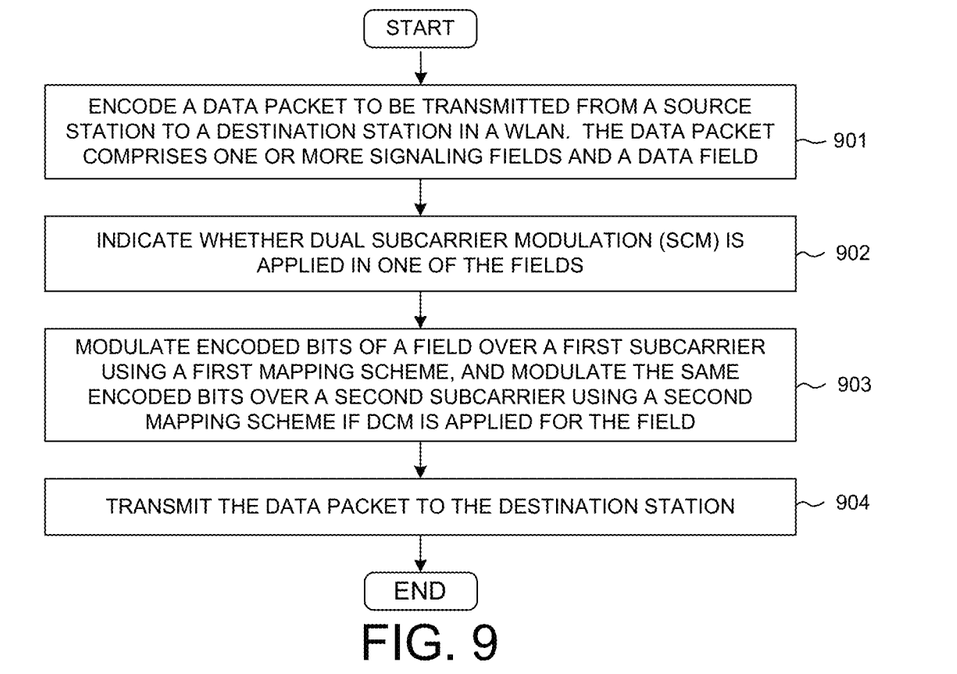
FIG. 9 is flow chart of a method of transmitting and encoding a HE PPDU frame with DCM indication in accordance with a novel aspect.

FIG. 9 is flow chart of a method of transmitting and encoding a HE PPDU frame with DCM indication in accordance with a novel aspect. In step 901, a source wireless station encodes a data packet to be transmitted to a destination wireless station in a wireless local area network. The data packet comprises one or more signaling fields and a data field. In step 902, the source wireless station indicates whether dual subcarrier modulation (DCM) is applied in one of the fields. In step 903, the source wireless station modulates encoded bits of a field over a first subcarrier using a first mapping scheme, and modulates the same encoded bits over a second subcarrier using a second mapping scheme if DCM is applied for the field. In step 904, the source station transmits the data packet to the destination station.

Figure 10:
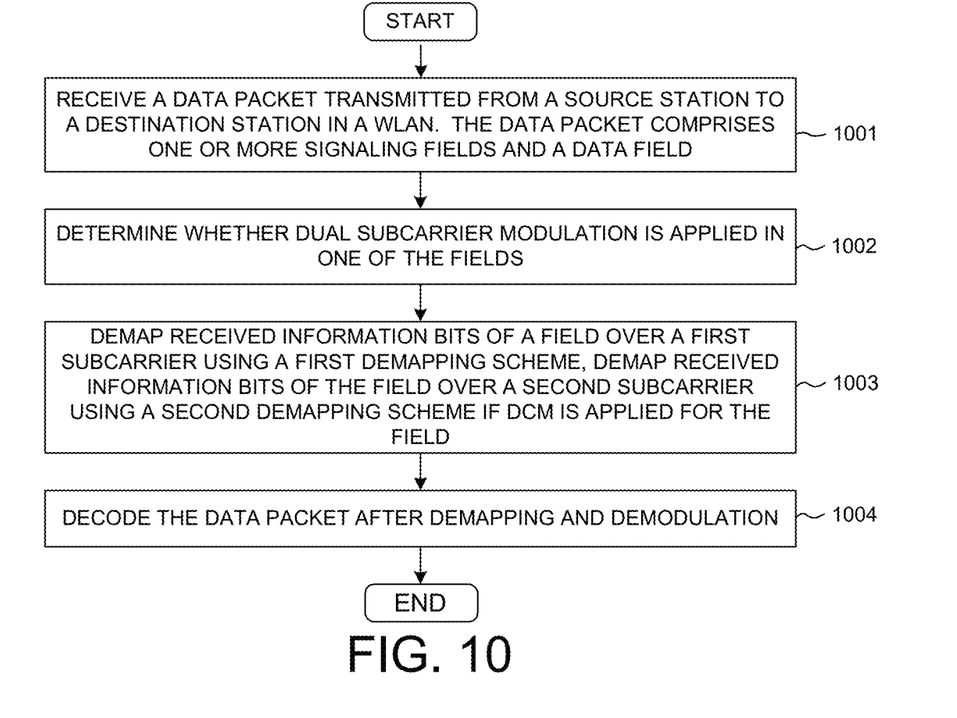
FIG. 10 is a flow chart of a method of receiving and decoding a HE PPDU frame with DCM indication in accordance with a novel aspect.

FIG. 10 is a flow chart of a method of receiving and decoding a HE PPDU frame with DCM indication in accordance with a novel aspect. In step 1001, a destination wireless station receives a data packet transmitted from a source wireless station in a wireless local area network (WLAN). The data packet comprises one or more signaling fields and a data field. In step 1002, the destination wireless station determines whether dual subcarrier modulation (DCM) is applied in one of the fields. In step 1003, the destination wireless station de-maps received information bits of a field over a first subcarrier using a first de-mapping scheme, and de-maps received information bits of the field over a second subcarrier using a second de-mapping scheme if DCM is applied for the field. In step 1004, the destination station decodes the data packet after performing the de-mapping and demodulation+.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
    encoding a data packet to be transmitted from a source station to a destination station in a wireless local area network, wherein the data packet comprises one or more signaling (SIG) fields and a data field;
    inserting a Dual Carrier Modulation (DCM) indication bit that indicates whether DCM is applied in one of the fields;
    modulating and mapping encoded bits of a field over a first sub-carrier using a first mapping scheme, and modulating and mapping the same encoded bits over a second sub-carrier using a second mapping scheme 4 when DCM is applied for the field; and
    generating the data packet with the DCM indication bit and transmitting the data packet to the destination station, wherein the data packet is either a single-user (SU) PPDU having a SIG-A field comprises the DCM indication bit indicating whether DCM is applied for the data field, or a multi-user (MU) PPDU having a SIG-A field followed by a SIG-B field.

2. The method of claim 1, wherein the SIG-A field comprises the DCM indication bit indicating whether DCM is applied for the SIG-B field.

3. The method of claim 1, wherein the SIG-B field comprises the DCM indication bit for each user indicating whether DCM is applied for data portion of the corresponding user.

4. The method of claim 1, wherein the first sub-carrier and the second sub-carrier are separated far apart in frequency domain.

5. A wireless transmitting device, comprising:
    an encoder that encodes a data packet to be transmitted from the transmitting device to a receiving device in a wireless local area network, wherein the data packet comprises one or more signaling (SIG) fields and a data field, wherein the wireless device inserts a Dual Carrier Modulation (DCM) bit indicating whether DCM is applied in one of the fields;
    a modulation circuit that modulates encoded bits of a field over a first sub-carrier using a first mapping scheme, and modulating the same encoded bits over a second sub-carrier using a second mapping scheme if DCM is applied for the field; and
    a transmitter that transmits the data packet to the destination station, wherein the data packet is either a single-user (SU) PPDU having a SIG-A field comprises the DCM indication bit indicating whether DCM is applied for the data field, or a multi-user (MU) PPDU having a SIG-A field followed by a SIG-B field.

6. The transmitting device of claim 5, wherein the SIG-A field comprises the DCM indication bit indicating whether DCM is applied for the SIG-B field.

7. The transmitting device of claim 5, wherein the SIG-B field comprises the DCM indication bit for each user indicating whether DCM is applied for data portion of the corresponding user.

8. A method comprising:
    receiving a data packet transmitted from a source station to a destination station in a wireless local area network, wherein the data packet comprises one or more signaling (SIG) fields and a data field;
    determining whether Dual Carrier Modulation (DCM) is applied in one of the fields;
    de-mapping received information bits of a field over a first sub-carrier using a first mapping scheme, and de-mapping received information bits of the field over a second sub-carrier using a second mapping scheme if DCM is applied for the field; and
    decoding the data packet after performing the de-mapping and de-modulation, wherein the data packet is either a single-user (SU) PPDU having a SIG-A field comprises a DCM indication bit indicating whether DCM is applied for the data field, or a multi-user (MU) PPDU having a SIG-A field followed by a SIG-B field.

9. The method of claim 8, wherein the SIG-A field of the MU PPDU comprises a DCM indication bit indicating whether DCM is applied for the SIG-B field.

10. The method of claim 8, wherein the SIG-B field of the MU PPDU comprises a DCM indication bit for each user indicating whether DCM is applied for data portion of the corresponding user.

11. The method of claim 8, wherein the destination station calculates LLR (logarithm likelihood ratio) of the received information bits by combining the first sub-carrier and the second sub-carrier.

12. The method of claim 8, wherein the destination station calculates LLR (logarithm likelihood ratio) of the received information bits from the first sub-carrier or from the second sub-carrier.

13. A wireless receiving device, comprising:
    a receiver that receives a data packet transmitted from a transmitting device to the receiving device in a wireless local area network, wherein the data packet comprises one or more signaling (SIG) fields and a data field, wherein the wireless device extracts a Dual Carrier Modulation (DCM) bit indicating whether DCM is applied in one of the fields;

a de-mapping circuit that de-maps received information bits of a field over a first sub-carrier using a first mapping scheme, and de-maps received information bits of the field over a second sub-carrier using a second mapping scheme if DCM is applied for the field; and a decoder that decodes the data packet after performing the de-mapping and de-modulation, wherein the data packet is either a single-user (SU) PPDU having a SIG-A field comprises a DCM indication bit indicating whether DCM is applied for the data field, or a multi-user (MU) PPDU having a SIG-A field followed by a SIG-B field.

14. The receiving device of claim 13, wherein the SIG-A field of the MU PPDU comprises a DCM indication bit indicating whether DCM is applied for the SIG-B field.

15. The receiving device of claim 13, wherein the SIG-B field of the MU PPDU comprises a DCM indication bit for each user indicating whether DCM is applied for data portion of the corresponding user.

16. The receiving device of claim 13, wherein the receiver calculates LLR (logarithm likelihood ratio) of the received information bits by combining the first sub-carrier and the second sub-carrier.

17. The receiving device of claim 13, wherein the receiver calculates LLR (logarithm likelihood ratio) of the received information bits from the first sub-carrier or from the second sub-carrier.

* * * * *

UNITED STATES PATENT AND TRADEMARK OFFICE
CERTIFICATE OF CORRECTION

PATENT NO. : 10,616,017 B2
APPLICATION NO. : 15/164690
DATED : April 7, 2020
INVENTOR(S) : Liu et al.

Page 1 of 1

It is certified that error appears in the above-identified patent and that said Letters Patent is hereby corrected as shown below:

In the Claims

Column 9, Line 52, delete "4" at the end of the sentence.

Signed and Sealed this
Sixteenth Day of June, 2020

Andrei Iancu
*Director of the United States Patent and Trademark Office*